US010316393B2

(12) United States Patent
Hoshi et al.

(10) Patent No.: US 10,316,393 B2
(45) Date of Patent: Jun. 11, 2019

(54) METHOD FOR RECOVERING RARE EARTH ELEMENT

(71) Applicant: HITACHI METALS, LTD., Tokyo (JP)

(72) Inventors: Hiroyuki Hoshi, Mishima-gun (JP); Yu Miyamoto, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 282 days.

(21) Appl. No.: 15/129,101

(22) PCT Filed: Mar. 26, 2015

(86) PCT No.: PCT/JP2015/059413
§ 371 (c)(1),
(2) Date: Sep. 26, 2016

(87) PCT Pub. No.: WO2015/147181
PCT Pub. Date: Oct. 1, 2015

(65) Prior Publication Data
US 2017/0137915 A1 May 18, 2017

(30) Foreign Application Priority Data

Mar. 28, 2014 (JP) .................................. 2014-067762
May 27, 2014 (JP) .................................. 2014-109600

(51) Int. Cl.
*C22B 59/00* (2006.01)
*C22B 1/02* (2006.01)
(Continued)

(52) U.S. Cl.
CPC ............ *C22B 59/00* (2013.01); *B09B 3/0083* (2013.01); *C22B 1/02* (2013.01); *C22B 7/001* (2013.01);
(Continued)

(58) Field of Classification Search
None
See application file for complete search history.

(56) References Cited

U.S. PATENT DOCUMENTS 9,322,082 B2 * 4/2016 Hoshi ..................... C22B 1/005
2006/0032327 A1 * 2/2006 Huege ..................... C21C 7/076
75/10.57
(Continued)

FOREIGN PATENT DOCUMENTS

CN 1071205 A 4/1993
CN 102181643 A 9/2011
(Continued)

OTHER PUBLICATIONS

U.S. Appl. No. 14/893,611 by Hiroyuki Hoshi, et al., filed Nov. 24, 2015 (48 Pages).
(Continued)

*Primary Examiner* — George Wyszomierski
(74) *Attorney, Agent, or Firm* — Kratz, Quintos & Hanson, LLP

(57) ABSTRACT

An object of the present invention is to provide a method for recovering a rare earth element, including subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, according to which an oxide of a rare earth element can be efficiently separated from an iron group element at low treatment cost, and also wear and damage to the treatment container can be suppressed to allow the container to be used repeatedly for a long period of time. The method of the present invention as a means for resolution is characterized in that the oxidation-treated workpiece is mixed with petro-
(Continued)

leum coke as a carbon supply source, placed in a treatment container, and then subjected to the heat treatment in an inert gas atmosphere or in vacuum at a temperature of 950° C. to 1150° C. (excluding 1150° C.).

6 Claims, 4 Drawing Sheets

(51) Int. Cl.
    *C22B 7/00*         (2006.01)
    *B09B 3/00*         (2006.01)
    *H01F 41/02*      (2006.01)

(52) U.S. Cl.
    CPC ........ *H01F 41/0253* (2013.01); *Y02P 10/214* (2015.11)

(56) References Cited

U.S. PATENT DOCUMENTS

| | | | |
|---|---|---|---|
| 2011/0070118 A1* | 3/2011 | Sagawa | B22F 3/087 419/30 |
| 2012/0237769 A1* | 9/2012 | Maeda | B22F 3/02 428/402 |

FOREIGN PATENT DOCUMENTS

| | | |
|---|---|---|
| CN | 102325911 A | 1/2012 |
| CN | 103160864 A | 6/2013 |
| JP | 2004-91811 A1 | 3/2004 |
| JP | 2005-2463 A1 | 1/2005 |
| JP | 2012-41588 A1 | 3/2012 |
| RU | 2020175 C1 | 9/1994 |
| WO | WO 2010/098381 A1 | 9/2010 |
| WO | WO 2013/018710 A1 | 2/2013 |
| WO | WO 2014/104205 A1 | 7/2014 |

OTHER PUBLICATIONS

International Search Report for International Application No. PCT/JP2015/059413 dated Jun. 23, 2015.
Chinese First Office Action for counterpart Chinese Patent Application No. 201580016947.4 dated Dec. 7, 2017 (6 Sheets).
Extended European Search Report for counterpart EPC Patent Application No. 15770282.0 dated Oct. 24, 2017 (7 Sheets).

* cited by examiner

[Fig. 1]
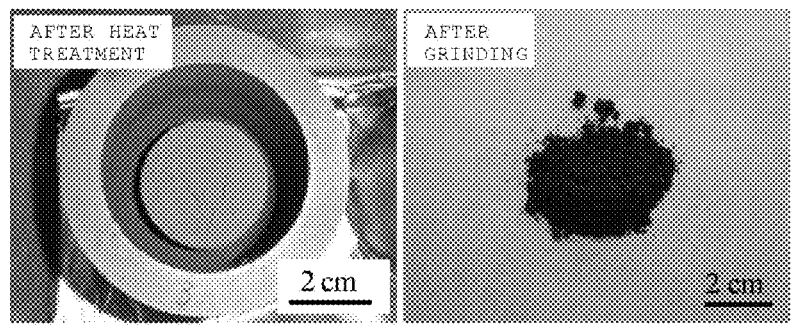
[Fig. 2]
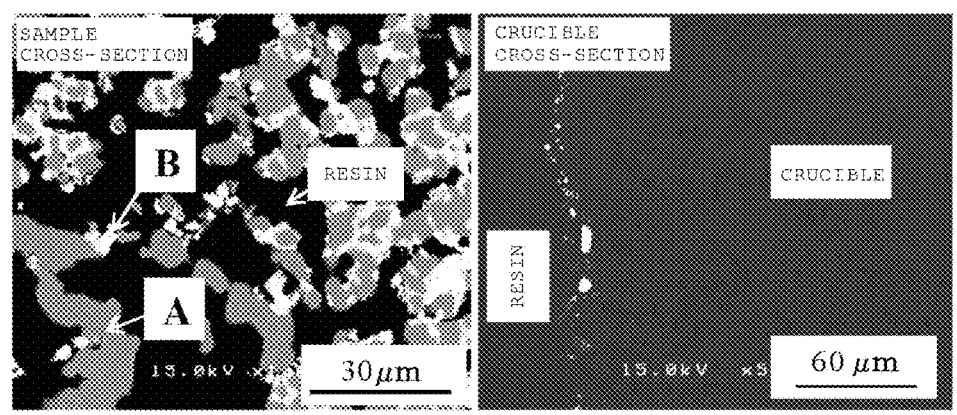
[Fig. 3]
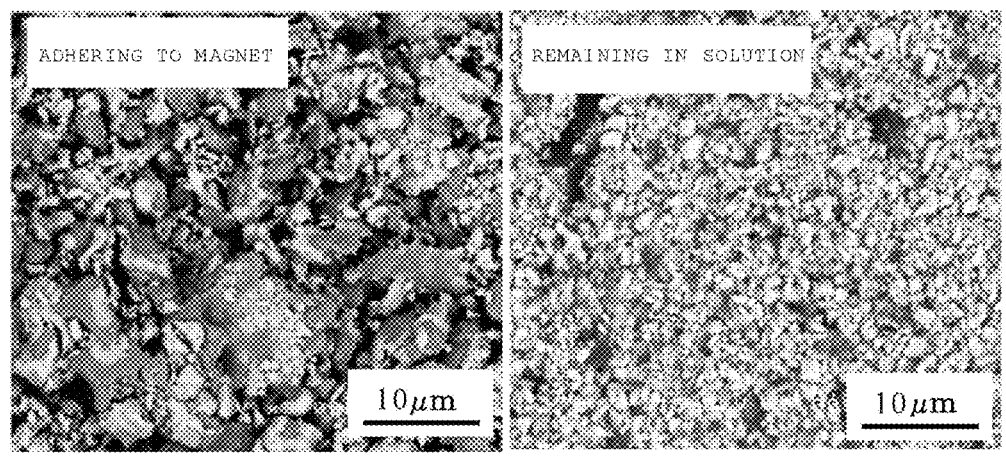

[Fig. 4]
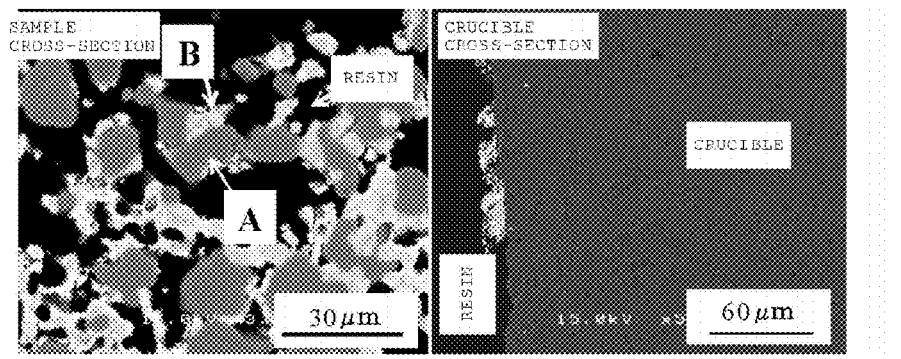
[Fig. 5]
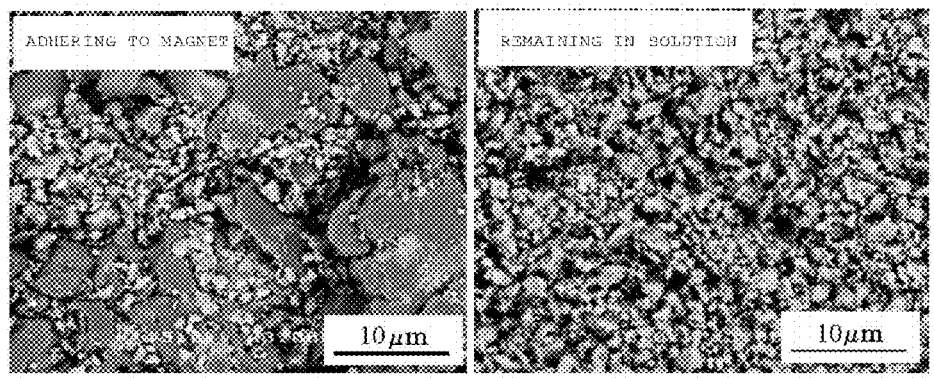
[Fig. 6]
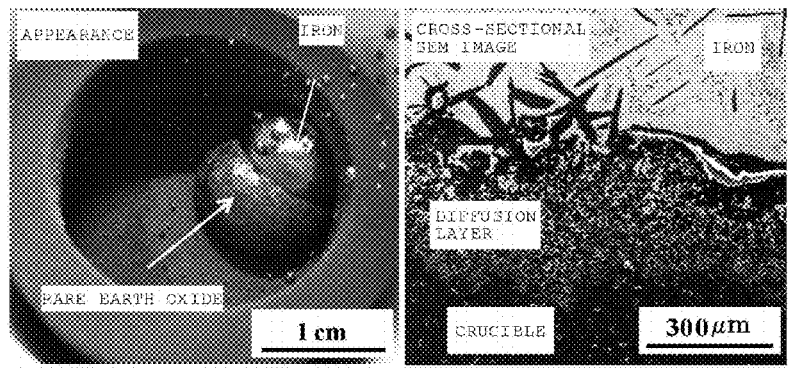

[Fig. 7]
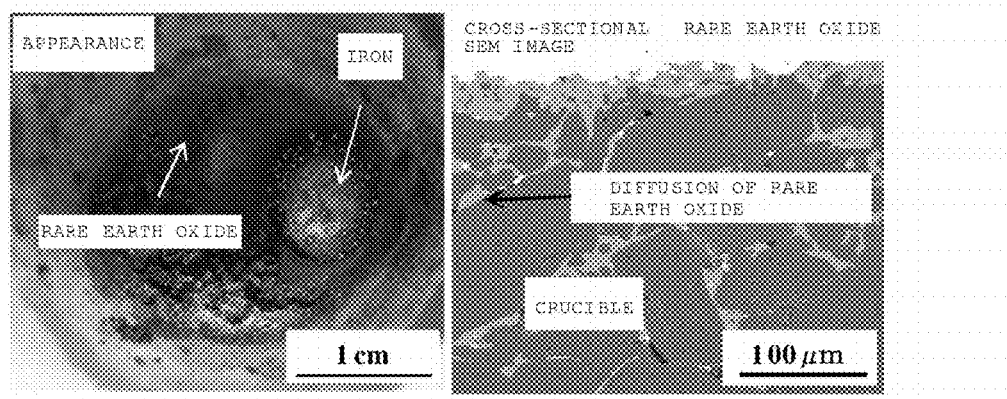
[Fig. 8]
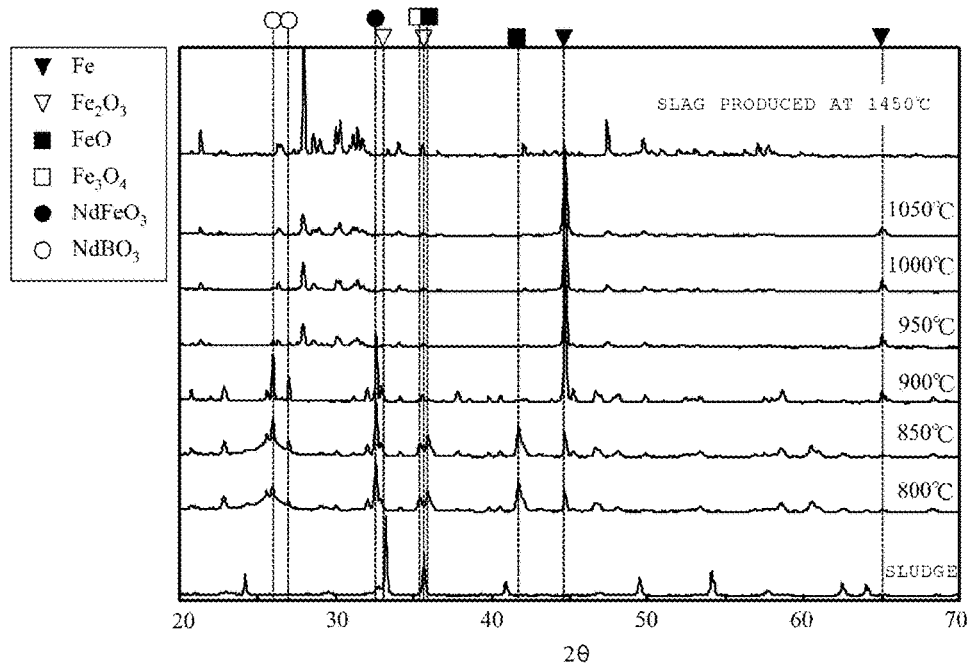

[Fig. 9]
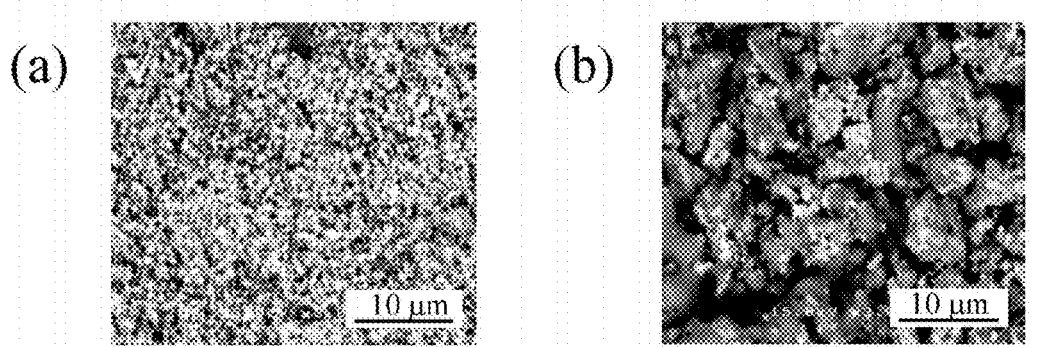

METHOD FOR RECOVERING RARE EARTH ELEMENT

TECHNICAL FIELD

The present invention relates to a method for recovering a rare earth element from a workpiece containing at least a rare earth element and an iron group element, such as an R—Fe—B based permanent magnet (R is a rare earth element).

BACKGROUND ART

As is widely known, R—Fe—B based permanent magnets have high magnetic characteristics and thus are used in various fields today. Against such a background, in R—Fe—B based permanent magnet production plants, large amounts of magnets are produced every day. However, with an increase in the amount of magnets produced, the amounts of magnet scrap discharged as a defectively processed product or the like, magnet processing waste discharged as cutting waste, grinding waste, or the like, etc., during the production process have also been increasing. In particular, with the weight and size reduction of information devices, the size of magnets used therein has also been reduced, leading to an increase in the proportion of processing allowance, and, as a result, the production yield tends to decrease year by year. Accordingly, rather than discarding magnet scrap, magnet processing waste, and the like discharged during the production process, how to recover and recycle metallic elements contained therein, particularly rare earth elements, is an important technical challenge for the future. The same also applies to how to recover rare earth elements from electrical appliances in which R—Fe—B based permanent magnets are used, etc., and recycle them as recyclable resources.

Several methods have been proposed as methods for recovering a rare earth element from a workpiece containing at least a rare earth element and an iron group element. For example, Patent Document 1 proposes a method in which a workpiece is heated in an oxidizing atmosphere to convert the contained metallic elements into oxides, followed by mixing with water to form a slurry; hydrochloric acid is added with heating to dissolve a rare earth element in a solution; an alkali (sodium hydroxide, ammonia, potassium hydroxide, etc.) is added to the obtained solution with heating, thereby precipitating an iron group element leached into the solution together with the rare earth element; then the solution is separated from undissolved substances and the precipitate; and oxalic acid, for example, is added to the solution as a precipitant to recover the rare earth element in the form of an oxalate. This method is noteworthy as a method that allows a rare earth element to be effectively separated from an iron group element and recovered. However, the method has a problem in that because an acid and an alkali are used in part of the process, it is not easy to control the process, and also the recovery cost is high. Therefore, it must be said that in some aspects, the method described in Patent Document 1 is difficult to put into practical use as a recycling system that is required to be low-cost and simple.

In addition, as a method for not oxidizing an iron group element contained in a workpiece but oxidizing only a rare earth element contained in the workpiece to thereby separate the two, Patent Document 2 proposes a method in which a workpiece is heated in a carbon crucible. Unlike the method described in Patent Document 1, this method does not require an acid or an alkali. In addition, when a workpiece is heated in a carbon crucible, theoretically, the atmosphere in the crucible is autonomously controlled to an oxygen partial pressure at which iron group elements are not oxidized and only rare earth elements are oxidized. Accordingly, this method is likely to be more advantageous than the method described in Patent Document 1 in that the process is simpler. However, when it comes to the question whether the atmosphere in a carbon crucible is autonomously controlled to a predetermined oxygen partial pressure by merely heating a workpiece in the crucible, whereby rare earth elements can be separated from iron group elements, the reality is not necessarily so. Patent Document 2 states that the oxygen content of the atmosphere in a crucible is preferably 1 ppm to 1%, but essentially no external operation is required to control the atmosphere. However, according to the study by the present inventors, at least in the case where the oxygen content is less than 1 ppm, rare earth elements cannot be separated from iron group elements. Therefore, even if it is theoretically possible that when a workpiece is heated in a carbon crucible, the atmosphere in the crucible is autonomously controlled to an oxygen partial pressure at which iron group elements are not oxidized and only rare earth elements are oxidized, in reality, the inside of the crucible has to be artificially controlled to an atmosphere having an oxygen content of 1 ppm or more. Such control can be achieved by introducing an inert gas having an oxygen content of 1 ppm or more into a crucible, as also described in Patent Document 2. However, in the case of argon gas, which is widely used as an industrial inert gas, its oxygen content is usually 0.5 ppm or less. Therefore, for introducing argon gas having an oxygen content of 1 ppm or more into a crucible, the widely used argon gas cannot be directly used, and it is necessary to especially increase the oxygen content before use. Consequently, although the process of the method described in Patent Document 2 looks simple, actually it is not. It must be said that like the method described in Patent Document 1, in some aspects, the method described in Patent Document 2 is difficult to put into practical use as a recycling system that is required to be low-cost and simple.

Thus, as a method for recovering a rare earth element from a workpiece containing at least a rare earth element and an iron group element, which can be put into practical use as a low-cost and simple recycling system, the present inventors have proposed, in Patent Document 3, a method in which a workpiece is subjected to an oxidation treatment, then the treatment environment is turned into an environment where carbon is present, and an oxidation-treated workpiece is subjected to a heat treatment at a temperature of 1150° C. or more, whereby a rare earth element is separated in the form of an oxide from an iron group element and recovered.

PRIOR ART DOCUMENTS

Patent Document

Patent Document 1: JP-A-2009-249674
Patent Document 2: WO 2010/098381
Patent Document 3: WO 2013/018710

SUMMARY OF THE INVENTION

Problems that the Invention is to Solve

According to the method proposed by the present inventors in Patent Document 3, an oxide of a rare earth element contained in the oxidation-treated workpiece melts while remaining an oxide at a high temperature. Meanwhile, an iron group element dissolves carbon to form an alloy and melts, and an oxide of an iron group element is reduced by carbon, then dissolves carbon to form an alloy and melts. As a result, a melt of an oxide of a rare earth element and a melt of an alloy of an iron group element and carbon are present independently of each other without compatibility, making it possible to separate the two as two kinds of masses produced in the treatment container. When the heat treatment is performed using a carbon crucible as a treatment container, although the carbon crucible serves as a carbon supply source from the surface thereof to the oxidation-treated workpiece, whereby an oxide of a rare earth element can be efficiently recovered, the carbon crucible is gradually worn. In addition, it may happen that two kinds of masses produced as a heat treatment product react with the inner surface of the treatment container and thus diffuse inside, for example, whereby they stick to the inner surface, and the removal thereof causes damage to the treatment container. Such sticking of two kinds of masses to the inner surface of a treatment container also occurs in the case where the oxidation-treated workpiece and a carbon supply source are placed in a non-carbon treatment container, such as a ceramic crucible made of a metal oxide including alumina, magnesium oxide, calcium oxide, etc., or silicon oxide, and heat-treated. Therefore, the method proposed by the present inventors in Patent Document 3 has a room for improvement in these respects. In addition, in terms of treatment cost, it is desirable if an oxide of a rare earth element can be separated from an iron group element at lower cost and at a lower temperature.

Thus, an object of the present invention is to provide a method for recovering a rare earth element, including subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, according to which an oxide of a rare earth element can be efficiently separated from an iron group element at low treatment cost, and also wear and damage to the treatment container can be suppressed to allow the container to be used repeatedly for a long period of time.

Means for Solving the Problems

In view of the above points, the present inventors have conducted extensive research. As a result, they have found the following. Using inexpensive petroleum coke as a carbon supply source, in the case where the oxidation-treated workpiece is mixed with petroleum coke and placed in a treatment container, followed by a heat treatment in an inert gas atmosphere or in vacuum, an oxide of a rare earth element can be separated from an iron group element even at a temperature of less than 1150° C., and also no wear or damage is caused to the treatment container.

A method for recovering a rare earth element of the present invention accomplished based on the above findings, which comprises subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, is characterized in that, as defined in claim 1, the oxidation-treated workpiece is mixed with petroleum coke as a carbon supply source, placed in a treatment container, and then subjected to the heat treatment in an inert gas atmosphere or in vacuum at a temperature of 950° C. to 1150° C. (excluding 1150° C.)

A method as defined in claim 2 is characterized in that in the method of claim 1, the petroleum coke is in granular or powder form having a particle size of 125 µm or less.

A method as defined in claim 3 is characterized in that in the method of claim 1, at least part of the workpiece is in granular or powder form having a particle size of 500 µm or less.

A method as defined in claim 4 is characterized in that in the method of claim 1, the workpiece has an iron group element content of 30 mass % or more.

A method as defined in claim 5 is characterized in that in the method of claim 1, the workpiece is an R—Fe—B based permanent magnet.

A method as defined in claim 6 is characterized in that in the method of claim 1, a mass obtained as a heat treatment product is ground, and then a powder containing an oxide of a rare earth element as a main component is separated from an alloy of an iron group element and carbon by a magnetic method and recovered.

Effect of the Invention

According to the method of the present invention, from a workpiece containing at least a rare earth element and an iron group element, an oxide of a rare earth element can be efficiently separated from an iron group element at low cost, and also wear and damage to the treatment container can be suppressed to allow the container to be used repeatedly for a long period of time.

BRIEF DESCRIPTION OF THE DRAWINGS

[FIG. 1] In Example 1, the inside of a crucible after the heat treatment and the appearance of a ground product of the obtained mass.

[FIG. 2] Similarly, a cross-sectional SEM image of individual particles of the ground product of the mass and a cross-sectional SEM image of the crucible near its bottom surface.

[FIG. 3] Similarly, SEM images of a powder adhering to the magnet and a powder remaining in ethanol.

[FIG. 4] In Example 4, a cross-sectional SEM image of individual particles of a ground product of the mass and a cross-sectional SEM image of the crucible near its bottom surface.

[FIG. 5] Similarly, SEM images of a powder adhering to the magnet and a powder remaining in ethanol.

[FIG. 6] In Comparative Example 4, the inside of a crucible after the heat treatment and a cross-sectional SEM image of the crucible near its bottom surface.

[FIG. 7] In Comparative Example 5, the inside of a crucible after the heat treatment and a cross-sectional SEM image of the crucible near its bottom surface.

[FIG. 8] In Reference Example 1, an X-ray diffraction chart of heat treatment products resulting from the heat treatments at various temperatures.

[FIG. 9] In Example 6, SEM images of a powder obtained from the supernatant (a) and a powder obtained from the residual liquid (b), respectively.

MODE FOR CARRYING OUT THE INVENTION

The method for recovering a rare earth element of the present invention, which comprises subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, is characterized in that the oxidation-treated workpiece is mixed with petroleum coke as a carbon supply source, placed in a treatment container, and then subjected to the heat treatment in an inert gas atmosphere or in vacuum at a temperature of 950° C. to 1150° C. (excluding 1150° C.).

The workpiece containing at least a rare earth element and an iron group element, to which the method of the present invention is to be applied, is not particularly limited as long as it contains a rare earth element, such as Nd, Pr, Dy, Tb, or Sm, and an iron group element, such as Fe, Co, or Ni. In addition to a rare earth element and an iron group element, additional elements such as boron may also be contained. Specific examples include R—Fe—B based permanent magnets, as well as a heavy rare earth element diffusion source made of an alloy of a heavy rare earth element and iron (e.g., an alloy piece made of $DyFe_2$, $DyFe_3$, $TbFe_2$, $TbFe_3$, etc.) for diffusing a heavy rare earth element into an R—Fe—B based permanent magnet, which has been used and thus further contains magnet-derived components (a light rare earth element, boron, etc.). However, the method of the present invention is particularly suitable for application to a workpiece having an iron group element content of 30 mass % or more (e.g., in the case of an R—Fe—B based permanent magnet, the iron group element content thereof is usually 60 mass % to 82 mass %). The size or form of the workpiece is not particularly limited. In the case where the workpiece is an R—Fe—B based permanent magnet, it may be magnet scrap, magnet processing waste, or the like discharged during the production process. In order for the workpiece to be sufficiently oxidation-treated, it is preferable that the workpiece is in granular or powder form having a particle size of 500 μm or less (e.g., in view of the ease of preparation, the lower limit of the particle size is preferably 1 μm). However, the entire workpiece does not necessarily have to be in such granular or powder form, and it is possible that only part of the workpiece is in granular or powder form.

First, in the method of the present invention, the oxidation treatment of a workpiece intends to convert a rare earth element contained in the workpiece into an oxide. Unlike the method described in Patent Document 2, as a result of the oxidation treatment of a workpiece, not only a rare earth element but also an iron group element contained in the workpiece may be converted into an oxide. The oxidation treatment of a workpiece can be easily performed by heat-treating or burning the workpiece in an oxygen-containing atmosphere. The oxygen-containing atmosphere may be ambient atmosphere. In the case where the workpiece is heat-treated, it may be performed at 350° C. to 1000° C. for 1 hour to 12 hours, for example. In the case where the workpiece is burned, it may be performed by spontaneous ignition or artificial ignition, for example. In addition, the oxidation treatment of a workpiece may also be performed by an alkali treatment, in which the oxidation of a workpiece proceeds in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution may be 0.1 mol/L to 10 mol/L. The treatment temperature may be 60° C. to 150° C., but is preferably 100° C. or more to increase the effectiveness of the oxidation treatment, and preferably 130° C. or less to further enhance safety. The treatment time may be 30 minutes to 10 hours. The oxidation treatment of a workpiece may be performed by a single method or may also be performed by a combination of a plurality of methods. As a result of the oxidation treatment of a workpiece in this manner, the molar concentration of oxygen contained in the workpiece becomes 1.5 times or more the molar concentration of rare earth elements, whereby the rare earth element can be converted into an oxide more reliably. It is preferable that as a result of the oxidation treatment, the molar concentration of oxygen contained in the workpiece becomes 2.0 times or more the molar concentration of rare earth elements. In addition, it is preferable that the oxidation treatment of a workpiece is performed in the absence of carbon. This is because when the oxidation treatment of a workpiece is performed in the presence of carbon, a rare earth element contained in the workpiece may undergo an undesirable chemical reaction with carbon, thereby inhibiting the desired conversion into an oxide (thus, "in the absence of carbon" herein means that carbon that causes a chemical reaction enough to inhibit the conversion of a rare earth element contained in the workpiece into an oxide is not present).

Next, the oxidation-treated workpiece is mixed with petroleum coke, placed in a treatment container, and then subjected to a heat treatment in an inert gas atmosphere or in vacuum at a temperature of 950° C. to 1150° C. (excluding 1150° C.). As a result, a simple mass made of coarse particles, in which an oxide of a rare earth element is microscopically separated from an iron group element and which are joined together to a degree that it would break with slight force, (a heat-shrunk fired body containing particles having a particle size of about 1 mm to 5 mm, for example) is obtained. This is based on the following phenomenon found by the present inventors. When the oxidation-treated workpiece is subjected to a heat treatment in an inert gas atmosphere or in vacuum at the above temperature while supplying petroleum coke as a carbon supply source, although an oxide of a rare earth element contained in the oxidation-treated workpiece remains an oxide, an iron group element dissolves carbon derived from the petroleum coke to form an alloy, or, in the case where an iron group element has been converted into an oxide by the oxidation treatment, an oxide of an iron group element is reduced by carbon derived from the petroleum coke and then dissolves carbon to form an alloy. As a result, an oxide of a rare earth element and an alloy of an iron group element and carbon are present microscopically independently of each other. The role of carbon is thus completely different from that in the method described in Patent Document 2, in which carbon is used to oxidize only a rare earth element, without oxidizing an iron group element, contained in the workpiece. In addition, the phenomenon is completely different from that in the method described in Patent Document 3, in which an oxide of a rare earth element and an alloy of an iron group element and carbon are separated as two kinds of masses. The reason why the heat treatment temperature is specified to 950° C. or more is that when the temperature is less than 950° C., the alloying of an iron group element contained in the workpiece with carbon does not sufficiently proceed, or, in the case where an iron group element has been converted into an oxide, the reduction of an oxide of an iron group element by carbon does not sufficiently proceed. As a result, an oxide of a rare earth element and an alloy of an iron group element and carbon are less likely to be present independently of each other, making it difficult to separate the two. Meanwhile, the reason why the heat treatment temperature is specified to less than 1150° C. is that when the temperature is 1150° C. or more, although an oxide of a rare earth element and an alloy of an iron group element and carbon both melt and thus are separated as two kinds of masses, the masses react with the inner surface of the treatment container and thus diffuse inside, for example, whereby they stick to the inner surface. It is preferable that the heat treatment temperature is 1000° C. to 1100° C. The reason why the heat treatment of a mixture of the oxidation-treated workpiece and petroleum coke is performed in an inert gas atmosphere or in vacuum is that when the heat treatment is performed in an oxygen-containing atmosphere such as ambient atmosphere, oxygen in the atmosphere may react with the petroleum coke to produce carbon dioxide, preventing the petroleum coke from efficiently serving as a carbon supply source to the oxidation-treated workpiece. In addition, in the case where there is remaining petroleum coke that has not been consumed in the heat treatment, the above configuration allows the excess petroleum coke in the treatment container after the heat treatment to be recovered and recycled. When the heat treatment is performed in an oxygen-containing atmosphere, the excess petroleum coke in the treatment container reacts with oxygen in the atmosphere to produce carbon dioxide and is discharged from the treatment container, and thus cannot be recovered any more. An inert gas atmosphere can be formed using argon gas, helium gas, nitrogen gas, etc. The oxygen content thereof is preferably less than 1 ppm. In addition, the vacuum level is preferably less than 1000 Pa. Incidentally, the heat treatment time is suitably 1 minute to 24 hours, for example.

In the method of the present invention, petroleum coke used as a carbon supply source to the oxidation-treated workpiece means coke made from petroleum. Specifically, it is a carbon-based substance obtained by the pyrolysis treatment, which is called coking, of heavy oil, such as reduced crude or vacuum residue, for example. In addition to "delayed coke" that is generally called petroleum coke, kinds of petroleum coke include "raw coke" collected from the coker and directly used, "calcined coke" obtained by burning raw coke to remove volatiles, and the like. In addition, depending on the coking method, there also is "fluid coke", which is in powder form and used as a fuel. In the method of the present invention, any such petroleum coke may be used as a carbon supply source. In order for petroleum coke to effectively serve as a carbon supply source, it is preferable that the petroleum coke is in granular or powder form having a particle size of 125 μm or less (e.g., in view of the ease of preparation, the lower limit of the particle size is preferably 1 μm). The amount of petroleum coke to be used depends also on the degree of oxidation of an iron group element contained in the workpiece as a result of the previous oxidation treatment, but is preferably 0.3 times or more, more preferably 0.5 times or more, and still more preferably 0.7 times or more, the molar amount of iron group elements contained in the workpiece. When the amount of petroleum coke used is adjusted to 0.7 times or more the molar amount of iron group elements contained in the workpiece, even when all the iron group elements contained in the workpiece are converted into oxides by the oxidation treatment, the oxides can be reliably reduced, allowing for the progress of alloying with carbon. Incidentally, the upper limit of the amount of petroleum coke used is not particularly limited. Even when an excessive amount of petroleum coke is used, the non-consumed petroleum coke does not adversely affect the separation between a rare earth element and an iron group element.

The mixture of the oxidation-treated workpiece and petroleum coke may be a simple mixture, or may also be pressed into a compact such as a briquette.

The material of the treatment container to place the mixture of the oxidation-treated workpiece and petroleum coke is not particularly limited. In addition to a carbon crucible used in the method described in Patent Document 2, it is also possible to use a non-carbon treatment container, such as a ceramic crucible made of a metal oxide including alumina, magnesium oxide, calcium oxide, etc., or silicon oxide (it may be made of a single material or may also be made of a plurality of materials). In particular, according to the method of the present invention, by using a ceramic crucible such as an alumina crucible, which is less expensive as compared with a carbon crucible, as a treatment container, a rare earth element can be efficiently recovered from a workpiece containing at least a rare earth element and an iron group element. At the same time, wear and damage to the treatment container can be suppressed to allow the container to be used repeatedly for a long period of time. This is advantageous in putting the method of the present invention into practical use as a recycling system that is required to be low-cost and simple.

When the mixture of the oxidation-treated workpiece and petroleum coke is placed in a treatment container, petroleum coke may be interposed between the mixture and the inner surface of the treatment container to prevent the mixture from contacting the inner surface of the treatment container. Accordingly, the reaction between the oxidation-treated workpiece and the inner surface of the treatment container can be suppressed. At the same time, even in the case where a carbon crucible is used as a treatment container, the wear of the carbon crucible as a result of serving as a carbon supply source can be suppressed.

When the mixture of the oxidation-treated workpiece and petroleum coke is heat-treated in this manner and then cooled, as described above, in the treatment container, a simple mass (a heat-shrunk fired body) made of coarse particles joined together to a degree that it would break with slight force is present. Individual particles forming this mass each have a microscopically separated two-phase structure; one is a phase containing an oxide of a rare earth element as a main component, while the other is a phase containing an alloy of an iron group element and carbon as a main component. Therefore, by grinding the individual particles forming this mass to a size of 10 μm or less, for example (the level of grinding is preferably 5 μm or less, more preferably 3 μm or less, and still more preferably 1 μm or less; the lower limit is 0.1 μm, for example), and then separating a powder derived from the phase containing an alloy of an iron group element and carbon as a main component by a magnetic method, a powder derived from the phase containing an oxide of a rare earth element as a main component can be recovered. The rare earth element content of the powder derived from the phase containing an oxide of a rare earth element as a main component depends also on a rare earth element content of the workpiece containing at least a rare earth element and an iron group element, the conditions for heat-treating the mixture of the oxidation-treated workpiece and petroleum coke, the conditions for grinding the mass obtained by the heat treatment, and the like, but is preferably 50 mass % or more, more preferably 60 mass % or more, and still more preferably 70 mass % or more. In addition, the iron group element content thereof is preferably 10 mass % or less, more preferably 5 mass % or less, and still more preferably 3 mass % or less. It is easy to grind the individual particles forming the mass. For example, grinding can be performed by a method in which particles are ball-milled using an alcohol such as ethanol as a solvent, a method in which particles are ground using a grinding machine, or the like. An oxide of a rare earth element recovered can be reduced by molten salt electrolysis, for example, and thus converted into a rare earth metal. In the case where there is excess petroleum coke in the treatment container after the heat treatment, the mass and petroleum coke present in the treatment container can be easily separated by a magnetic method or using a screen. The separated petroleum coke can be recovered and recycled as described above. In addition, it is also possible that the simple mass present in the treatment container is melted by a heat treatment at a temperature of 1300° C. or more, thereby separating an oxide of a rare earth element and an alloy of an iron group element and carbon as two kinds of masses (this treatment causes little, if any, wear and damage to the treatment container described above).

In addition, in the case where the molar concentration of boron contained in the oxidation-treated workpiece is 0 to 0.50 times the molar concentration of rare earth elements, the simple mass obtained by the heat treatment according to the method of the present invention, followed by cooling, reacts with water and thus is spontaneously disintegrated. The disintegrated mass is a mixture of a powder containing an oxide of a rare earth element as a main component and a powder containing a large amount of iron group elements. The present inventors have confirmed that when the molar concentration of boron contained in the oxidation-treated workpiece is low, $R_2O_3$ (R is a rare earth element) is produced as an oxide of a rare earth element, and, when such $R_2O_3$ reacts with water to become a hydroxide, the resulting volume expansion serves as a starting point for an oxide of a rare earth element and an iron group element to be separated as powders. They have also confirmed that when the molar concentration of boron contained in the oxidation-treated workpiece is more than 0.50 times the molar concentration of rare earth elements, $RBO_3$ is likely to be produced as an oxide of a rare earth element, whereby $R_2O_3$, which reacts with water to become a hydroxide, causing volume expansion, is less likely to be produced; as a result, a simple mass made of coarse particles joined together to a degree that it would break with slight force, wherein an oxide of a rare earth element and an iron group element are separated as powders by the action of water, is no longer obtained as a heat treatment product. In the case where the molar concentration of boron contained in the oxidation-treated workpiece is more than 0.50 times the molar concentration of rare earth elements, it is possible to perform a treatment to reduce the molar concentration of boron to 0.50 times or less the molar concentration of rare earth elements. As a specific method therefor, for example, an alkali treatment can be mentioned, which is performed with the oxidation-treated workpiece being immersed in an aqueous alkali solution. Examples of alkalis that can be used for the alkali treatment include sodium hydroxide, potassium hydroxide, sodium hydrogen carbonate, sodium carbonate, and ammonia. In addition, the concentration of the aqueous alkali solution may be 0.1 mol/L to 10 mol/L. The treatment temperature may be 60° C. to 150° C., and the treatment time may be 30 minutes to 10 hours. Incidentally, the treatment to reduce the molar concentration of boron contained in the oxidation-treated workpiece may be performed prior to the oxidation treatment of a workpiece. In addition, as described above, the oxidation treatment of a workpiece can be performed by an alkali treatment. Thus, the oxidation treatment of a workpiece and the treatment to reduce the molar concentration of boron contained in the workpiece may be simultaneously performed by an alkali treatment. Further, the treatment to reduce the molar concentration of boron may also be performed even when the molar concentration of boron contained in the oxidation-treated workpiece is 0.50 times or less the molar concentration of rare earth elements. The molar concentration of boron contained in the oxidation-treated workpiece is preferably 0.30 times or less, more preferably 0.20 times or less, and still more preferably 0.10 times or less, the molar concentration of rare earth elements.

The powder containing an oxide of a rare earth element as a main component and the powder containing a large amount of iron group elements, which are obtained after the disintegration of the heat treatment product due to reaction with water, are different in size. The former is smaller than the latter (the particle size of the former is about 1 μm to 5 μm, while the particle size of the latter is about 5 μm to 30 μm), and its specific gravity is smaller. Therefore, the two can be easily separated by sieving a mixture of the two or by dispersing them in water, followed by decantation. In addition, the two can also be separated by a magnetic method. The rare earth element content of the powder containing an oxide of a rare earth element as a main component is preferably 50 mass % or more, more preferably 60 mass % or more, and still more preferably 70 mass % or more. In addition, the iron group element content thereof is preferably 20 mass % or less, more preferably 15 mass % or less, and still more preferably 10 mass % or less. Incidentally, the method for allowing the heat treatment product to react with water is not particularly limited. The method may be such that the heat treatment product is immersed in water to cause reaction, or may also be such that the heat treatment product is allowed to stand in air to cause reaction with water in air. The time of the reaction between the heat treatment product and water (time taken for the heat treatment product to be disintegrated) depends on the amount to be treated, etc., but may be 1 minute to 10 days, for example. In addition, in order to promote the reaction between the heat treatment product and water, it is possible to employ high-temperature and high-humidity (pressurized) conditions. The high-temperature and high-humidity (pressurized) conditions may be as follows, for example; temperature: 80° C. to 140° C., relative humidity: 80% to 100%, pressure: 1 atm to 3 atm.

In the case where the workpiece containing at least a rare earth element and an iron group element, to which the method of the present invention is to be applied, contains boron as an additional element, such as in the case of an R—Fe—B based permanent magnet, boron is somewhat contained in an oxide of a rare earth element recovered by separation from an alloy of an iron group element and carbon by the method of the present invention. When such a boron-containing oxide of a rare earth element is reduced by molten salt electrolysis using a fluorine-containing molten salt component, boron contained in the oxide of a rare earth element may react with fluorine to produce harmful boron fluoride. Therefore, in such a case, it is preferable to previously reduce the boron content of the oxide of a rare earth element. The boron content of a boron-containing oxide of a rare earth element can be reduced, for example, by a heat treatment of the boron-containing oxide of a rare earth element together with a carbonate of an alkali metal (lithium carbonate, sodium carbonate, potassium carbonate, etc.) or an oxide of an alkali metal in the presence of carbon, for example. The amount of a carbonate or an oxide of an alkali metal used may be 0.1 parts by weight to 2 parts by weight per part by weight of a boron-containing oxide of a rare earth element, for example.

EXAMPLES

Hereinafter, the present invention will be described in detail with reference to the examples. However, the present invention should not be construed as being limited to the following descriptions.

Example 1

Magnet processing waste having a particle size of about 10 μm produced during the R—Fe—B based permanent magnet production process (stored in water for seven days to prevent spontaneous ignition) was dehydrated by suction filtration, and then subjected to an oxidation treatment by burning treatment using a rotary kiln. The magnet processing waste thus oxidation-treated was subjected to SEM-EDX analysis (apparatus used: S4500 manufactured by Hitachi High-Technologies Corporation; the same hereinafter). The results are shown in Table 1. The molar concentration of oxygen contained in the oxidation-treated magnet processing waste was 4.2 times the molar concentration of rare earth elements.

TABLE 1

|  | Fe | Nd | Pr | Dy | Al | C | O |
|---|---|---|---|---|---|---|---|
| Oxidation-Treated Magnet Processing Waste | 49.2 | 19.9 | 6.1 | 3.4 | 1.0 | 4.5 | 13.7 |

(Unit: mass %)

A mixture obtained by grinding 50 g of the oxidation-treated magnet processing waste together with 4 g of petroleum coke (R coke manufactured by DAINEN CO., LTD., particle size <5 mm; the same hereinafter) (molar ratio relative to iron contained in the magnet processing waste: 0.75) using a mortar and a pestle to a particle size of 125 μm or less was placed in a carbon crucible (made of black lead) having a dimension of 70 mm in outer diameter×70 mm in height×10 mm in thickness, and then subjected to a heat treatment in an industrial argon gas atmosphere (oxygen content: 0.2 ppm, flow rate: 5 L/min; the same hereinafter) at 1050° C. for 12 hours. Subsequently, the carbon crucible was furnace-cooled to room temperature. As a result, in the crucible, a simple mass made of coarse particles joined together to a degree that it would break with slight force was present without fixing to the crucible. It was easy to grind this mass using a mortar and a pestle. FIG. 1 shows the inside of the crucible after the heat treatment and the appearance of a ground product of the obtained mass. In addition, FIG. 2 (cross-sectional SEM image) and Table 2 show the results of SEM-EDX analysis of the cross-section of individual particles of the ground product of the mass. FIG. 2 also shows a cross-sectional SEM image of the crucible near its bottom surface. As is clear from FIG. 2 and Table 2, it turned out that the individual particles of the ground product of the mass each had a two-phase structure including phase A and phase B, and that the phase A contained iron and carbon as main components, while the phase B contained rare earth elements and oxygen as main components. Incidentally, X-ray diffraction analysis was separately performed using a standard sample (apparatus used: RINT2400 manufactured by Rigaku Corporation; the same hereinafter) to confirm that the rare earth elements in the phase B were oxides (the same hereinafter). In addition, in the crucible, no change or wear resulting from a reaction with the oxidation-treated magnet processing waste was observed (although some weight loss of the crucible was observed, the degree thereof was less than 0.1%, which is almost equal to the weight loss in the case of heat-treating the crucible alone).

TABLE 2

|  | Fe | Nd | Pr | Dy | Al | C | O |
|---|---|---|---|---|---|---|---|
| Phase A | 87.0 | 1.0 | 0.5 | 0.0 | 0.3 | 6.4 | 1.5 |
| Phase B | 1.7 | 44.0 | 12.1 | 23.9 | 0.1 | 5.3 | 12.2 |

(Unit: mass %)

20 g of the ground product of the mass was placed in a closed vessel together with 1000 g of zirconia balls (YTZ ball) and 250 mL of ethanol, and finely ground to a size of 10 μm or less by ball milling at room temperature for 6 hours. Subsequently, the zirconia balls were removed, followed by magnetic selection with stirring in ethanol. FIG. 3 (SEM images) and Table 3 show the results of SEM-EDX analysis of a powder adhering to the magnet and a powder remaining in ethanol. Table 3 also shows the results of EDX analysis of the ground product of the mass before fine grinding. As is clear from Table 3, the iron content and the rare earth element content of the powder remaining in ethanol were 0.9 mass % and 55.7 mass % (total content of Nd, Pr, and Dy; the same hereinafter), respectively, showing that rare earth elements were effectively separated in the form of oxides from the magnet processing waste used as a workpiece (X-ray diffraction analysis was separately performed using a standard sample to confirm that the rare earth elements were oxides; the same hereinafter). It appears that the powder remaining in ethanol is a powder derived from the phase B containing oxides of rare earth elements as main components.

TABLE 3

|  | Fe | Nd | Pr | Dy | Al | C | O |
|---|---|---|---|---|---|---|---|
| Ground Product of Mass | 36.4 | 36.9 | 3.7 | 3.7 | 1.5 | 8.3 | 7.1 |
| Powder Adhering to Magnet | 42.8 | 29.4 | 7.3 | 4.9 | 0.9 | 6.6 | 6.1 |
| Powder Remaining in Ethanol | 0.9 | 38.5 | 10.9 | 6.3 | 2.0 | 28.5 | 11.6 |

(Unit: mass %)

Example 2

A mass was obtained in the same manner as in Example 1, except that the heat treatment temperature was changed to 1000° C. The mass was ground using a mortar and a pestle, and further finely ground by ball milling, followed by magnetic selection, thereby giving a powder adhering to the magnet and a powder remaining in ethanol. Table 4 shows the results of EDX analysis of each powder. Table 4 also shows the results of EDX analysis of the ground product of the mass before fine grinding. As is clear from Table 4, the iron content and the rare earth element content of the powder remaining in ethanol were 1.9 mass % and 78.9 mass %, respectively, showing that rare earth elements were effectively separated in the form of oxides from the magnet processing waste used as a workpiece.

TABLE 4

|  | Fe | Nd | Pr | Dy | Al | C | O |
|---|---|---|---|---|---|---|---|
| Ground Product of Mass | 34.1 | 32.7 | 9.8 | 4.2 | 1.4 | 9.9 | 6.2 |
| Powder Adhering to Magnet | 50.0 | 21.8 | 6.5 | 1.5 | 0.6 | 11.1 | 6.5 |
| Powder Remaining in Ethanol | 1.9 | 51.8 | 15.0 | 12.1 | 0.8 | 7.0 | 11.0 |

(Unit: mass %)

Example 3

A mass was obtained in the same manner as in Example 1, except that the heat treatment temperature was changed to 950° C. The mass was ground using a mortar and a pestle, and further finely ground by ball milling, followed by magnetic selection, thereby giving a powder adhering to the magnet and a powder remaining in ethanol. Table 5 shows the results of EDX analysis of each powder. Table 5 also shows the results of EDX analysis of the ground product of the mass before fine grinding. As is clear from Table 5, the iron content and the rare earth element content of the powder remaining in ethanol were 6.9 mass % and 74.3 mass %, respectively, showing that rare earth elements were effectively separated in the form of oxides from the magnet processing waste used as a workpiece.

TABLE 5

|  | Fe | Nd | Pr | Dy | Al | C | O |
|---|---|---|---|---|---|---|---|
| Ground Product of Mass | 50.3 | 22.0 | 6.7 | 1.1 | 1.1 | 11.5 | 4.7 |
| Powder Adhering to Magnet | 60.6 | 17.6 | 5.5 | 0.0 | 0.9 | 8.9 | 3.3 |
| Powder Remaining in Ethanol | 6.9 | 48.8 | 13.8 | 11.7 | 0.8 | 7.4 | 9.9 |

(Unit: mass %)

Example 4

A ground product of a mass was obtained in the same manner as in Example 1, except that an alumina crucible having a dimension of 67 mm in outer diameter×50 mm in height×2.5 mm in thickness was used as a treatment container. FIG. 4 (cross-sectional SEM image) and Table 6 show the results of SEM-EDX analysis of the cross-section of individual particles of the ground product of the mass. FIG. 4 also shows a cross-sectional SEM image of the crucible near its bottom surface. As is clear from FIG. 4 and Table 6, it turned out that the individual particles of the ground product of the mass each had a two-phase structure including phase A and phase B, and that the phase A contained iron and carbon as main components, while the phase B contained rare earth elements and oxygen as main components. In addition, in the crucible, no change or wear resulting from a reaction with the oxidation-treated magnet processing waste was observed (although some weight loss of the crucible was observed, the degree thereof was less than 0.1%, which is almost equal to the weight loss in the case of heat-treating the crucible alone).

TABLE 6

|  | Fe | Nd | Pr | Dy | Al | C | O |
|---|---|---|---|---|---|---|---|
| Phase A | 83.8 | 1.4 | 0.5 | 0.0 | 0.2 | 9.0 | 1.7 |
| Phase B | 2.5 | 46.2 | 13.3 | 13.3 | 0.1 | 10.1 | 14.0 |

(Unit: mass %)

20 g of the ground product of the mass was finely ground in the same manner as in Example 1, followed by magnetic selection, thereby giving a powder adhering to the magnet and a powder remaining in ethanol. FIG. 5 (SEM images) and Table 7 show the results of SEM-EDX analysis of each powder. Table 7 also shows the results of EDX analysis of the ground product of the mass before fine grinding. As is clear from Table 7, the iron content and the rare earth element content of the powder remaining in ethanol were 6.3 mass % and 76.1 mass %, respectively, showing that rare earth elements were effectively separated in the form of oxides from the magnet processing waste used as a workpiece.

TABLE 7

|  | Fe | Nd | Pr | Dy | Al | C | O |
|---|---|---|---|---|---|---|---|
| Ground Product of Mass | 42.5 | 30.6 | 8.4 | 1.6 | 1.4 | 6.3 | 6.9 |
| Powder Adhering to Magnet | 51.3 | 26.7 | 7.5 | 0.2 | 1.0 | 5.0 | 5.7 |
| Powder Remaining in Ethanol | 6.3 | 51.4 | 13.8 | 10.9 | 1.0 | 4.7 | 11.3 |

(Unit: mass %)

Comparative Example 1

A mass was obtained in the same manner as in Example 1, except that the heat treatment temperature was changed to 900° C. The mass was ground using a mortar and a pestle, and further finely ground by ball milling, followed by magnetic selection, thereby giving a powder adhering to the magnet and a powder remaining in ethanol. Table 8 shows the results of EDX analysis of each powder. Table 8 also shows the results of EDX analysis of the ground product of the mass before fine grinding. As is clear from Table 8, the iron content and the rare earth element content of the powder remaining in ethanol were 11.4 mass % and 59.3 mass %, respectively. Thus, it was not possible to say that rare earth elements were effectively separated in the form of oxides from the magnet processing waste used as a workpiece.

TABLE 8

|  | Fe | Nd | Pr | Dy | Al | C | O |
|---|---|---|---|---|---|---|---|
| Ground Product of Mass | 33.3 | 35.4 | 10.7 | 3.0 | 1.0 | 5.7 | 9.1 |
| Powder Adhering to Magnet | 44.9 | 15.2 | 4.5 | 0.0 | 0.4 | 28.2 | 4.8 |
| Powder Remaining in Ethanol | 11.4 | 39.7 | 11.3 | 8.3 | 0.8 | 15.3 | 12.7 |

(Unit: mass %)

Comparative Example 2

A mass was obtained in the same manner as in Example 1, except that the heat treatment temperature was changed to 850° C. The mass was ground using a mortar and a pestle, and further finely ground by ball milling, followed by magnetic selection, thereby giving a powder adhering to the magnet and a powder remaining in ethanol. Table 9 shows the results of EDX analysis of each powder. Table 9 also shows the results of EDX analysis of the ground product of the mass before fine grinding. As is clear from Table 9, the iron content and the rare earth element content of the powder remaining in ethanol were 28.3 mass % and 35.7 mass %, respectively. Thus, it was not possible to say that rare earth elements were effectively separated in the form of oxides from the magnet processing waste used as a workpiece.

TABLE 9

|  | Fe | Nd | Pr | Dy | Al | C | O |
|---|---|---|---|---|---|---|---|
| Ground Product of Mass | 49.0 | 21.4 | 7.0 | 0.6 | 1.4 | 8.4 | 10.1 |
| Powder Adhering to Magnet | 46.1 | 15.9 | 4.7 | 2.8 | 0.5 | 17.3 | 10.9 |
| Powder Remaining in Ethanol | 28.3 | 25.1 | 7.4 | 3.2 | 0.4 | 19.3 | 15.7 |

(Unit: mass %)

Comparative Example 3

A mass was obtained in the same manner as in Example 1, except that the heat treatment temperature was changed to 800° C. The mass was ground using a mortar and a pestle, and further finely ground by ball milling, followed by magnetic selection, thereby giving a powder adhering to the magnet and a powder remaining in ethanol. Table 10 shows the results of EDX analysis of each powder. Table 10 also shows the results of EDX analysis of the ground product of the mass before fine grinding. As is clear from Table 10, the iron content and the rare earth element content of the powder remaining in ethanol were 16.3 mass % and 20.1 mass %, respectively. Thus, it was not possible to say that rare earth elements were effectively separated in the form of oxides from the magnet processing waste used as a workpiece.

TABLE 10

|  | Fe | Nd | Pr | Dy | Al | C | O |
|---|---|---|---|---|---|---|---|
| Ground Product of Mass | 48.5 | 21.0 | 6.2 | 0.4 | 1.4 | 8.3 | 11.7 |
| Powder Adhering to Magnet | 45.6 | 17.5 | 5.0 | 1.3 | 0.4 | 16.3 | 12.2 |
| Powder Remaining in Ethanol | 16.3 | 14.0 | 4.1 | 2.0 | 0.2 | 52.6 | 10.6 |

(Unit: mass %)

Comparative Example 4

A mass was obtained in the same manner as in Example 1, except that the heat treatment temperature was changed to 1450° C. FIG. 6 shows the inside of the crucible after the heat treatment and a cross-sectional SEM image of the crucible near its bottom surface. As is clear from FIG. 6, in the case where the heat treatment temperature was 1450° C., an oxide of a rare earth element and an alloy of an iron group element and carbon both melted and thus were separated as two kinds of masses. However, the diffusion of iron inside the crucible was observed as a change resulting from the reaction with the oxidation-treated magnet processing waste.

Comparative Example 5

A mass was obtained in the same manner as in Example 4, except that the heat treatment temperature was changed to 1450° C. FIG. 7 shows the inside of the crucible after the heat treatment and a cross-sectional SEM image of the crucible near its bottom surface. As is clear from FIG. 7, in the case where the heat treatment temperature was 1450° C., an oxide of a rare earth element and an alloy of an iron group element and carbon both melted and thus were separated as two kinds of masses. However, the diffusion of oxides of rare earth elements inside the crucible was observed as a change resulting from the reaction with the oxidation-treated magnet processing waste.

Reference Example 1

X-ray diffraction was performed on a ground product obtained by grinding the oxidation-treated magnet processing waste using a mortar and a pestle, ground products of masses obtained by heat treatments at 800° C. (Comparative Example 3), 850° C. (Comparative Example 2), 900° C. (Comparative Example 1), 950° C. (Example 3), 1000° C. (Example 2), and 1050° C. (Example 1), respectively, and a ground product obtained by grinding a mass obtained by a heat treatment at 1450° C. (Comparative Example 4) and containing oxides of rare earth elements as main components using a mortar and a pestle. The results are shown in FIG. 8. As is clear from FIG. 8, although a ground product (sludge) of the oxidation-treated magnet processing waste contains $Fe_2O_3$ as a main component, as a result of heat treatments, the peak of $Fe_2O_3$ gradually decreased, and the peak of $NdFeO_3$ gradually increased instead. However, when the heat treatment temperature is 950° C. or more, the peak of $NdFeO_3$ disappears, and trivalent iron is completely reduced, whereby the peak of Fe becomes obvious. However, the X-ray diffraction pattern thereof was almost the same as that of the ground product (slag) of the mass containing oxides of rare earth elements as main components obtained by the heat treatment at 1450° C., except for the peak of Fe. From the above results, it turned out that in order for rare earth elements to be effectively separated in the form of oxides from magnet processing waste used as a workpiece, the heat treatment temperature has to be 950° C. or more.

Example 5

A mass was obtained in the same manner as in Example 1, except that the heat treatment temperature was changed to 1100° C. The mass was ground using a mortar and a pestle, and further finely ground by ball milling, followed by magnetic selection, thereby giving a powder adhering to the magnet and a powder remaining in ethanol. Table 11 shows the results of EDX analysis of each powder. Table 11 also shows the results of EDX analysis of the ground product of the mass before fine grinding. As is clear from Table 11, the iron content and the rare earth element content of the powder remaining in ethanol were 0.7 mass % and 70.3 mass %, respectively, showing that rare earth elements were effectively separated in the form of oxides from the magnet processing waste used as a workpiece.

TABLE 11

|  | Fe | Nd | Pr | Dy | Al | C | O |
|---|---|---|---|---|---|---|---|
| Ground Product of Mass | 38.4 | 25.5 | 7.2 | 2.7 | 0.9 | 18.3 | 5.6 |
| Powder Adhering to Magnet | 60.3 | 19.6 | 5.8 | 2.2 | 0.5 | 5.7 | 3.7 |
| Powder Remaining in Ethanol | 0.7 | 50.4 | 13.1 | 6.8 | 0.7 | 12.2 | 12.5 |

(Unit: mass %)

Example 6

Magnet processing waste having a particle size of about 10 μm produced during the R—Fe—B based permanent magnet production process (stored in water for seven days to prevent spontaneous ignition) was dehydrated by suction filtration, and then subjected to an oxidation treatment by burning treatment using a rotary kiln. 50 g of the oxidation-treated magnet processing waste thus obtained was immersed in 300 mL of a 5 mol/L aqueous sodium hydroxide solution heated to 100° C. to perform an alkali treatment. After 8 hours, the oxidation-treated magnet processing waste was taken out from the aqueous sodium hydroxide solution, washed with water, and then allowed to dry naturally. As a result of the alkali treatment, whereas the molar concentration of boron contained in the oxidation-treated magnet processing waste before the treatment was 0.44 times the molar concentration of rare earth elements (0.78 mass %), the concentration after the treatment was 0.19 times the molar concentration of rare earth elements (0.33 mass %). A mixture obtained by grinding 5 g of the oxidation-treated magnet processing waste after the alkali treatment together with 0.4 g of petroleum coke (molar ratio relative to iron contained in the magnet processing waste: 0.75) using a mortar and a pestle to a particle size of 125 μm or less was placed in a carbon crucible (made of black lead) having a dimension of 70 mm in outer diameter×70 mm in height×10 mm in thickness, and then subjected to a heat treatment in an industrial argon gas atmosphere at 1050° C. for 12 hours. Subsequently, the carbon crucible was furnace-cooled to room temperature. As a result, in the crucible, a simple mass made of coarse particles joined together to a degree that it would break with slight force was present without fixing to the crucible. Using a pressure cooker tester, the mass was allowed to react with water for 6 hours under the following high-temperature and high-humidity pressurized conditions; temperature: 100° C., relative humidity: 100%, pressure: 2 atm. As a result, the mass was spontaneously disintegrated into a powder. The obtained powder was added to 100 mL of pure water, ultrasonically dispersed for 3 minutes, and then allowed to stand for 3 minutes, and the supernatant was collected by decantation. Subsequently, 100 mL of pure water was added to the residual liquid, ultrasonically dispersed for 3 minutes, and then allowed to stand for 3 minutes, followed by collecting the supernatant by decantation; this step was repeated 13 times in total. The entire supernatant collected was suction-filtered to give about 0.5 g of a powder having a particle size of about 2 μm on the filter paper. Meanwhile, the final residual liquid was suction-filtered to give 3.0 g of a powder having a particle size of about 5 μm on the filter paper. The powder obtained from the supernatant (powder floating in water: a) and the powder obtained from the residual liquid (powder settled in water: b) were each subjected to SEM-EDX analysis. The results are shown in FIG. 9 (SEM images) and Table 12. As is clear from Table 12, the powder obtained from the supernatant contained rare earth elements as main components, while in the powder obtained from the residual liquid, the content of iron was highest among all the components, showing that a powder containing oxides of rare earth elements as main components can be obtained from the magnet processing waste (to make sure, X-ray diffraction analysis was separately performed using a standard sample to confirm that the rare earth elements were oxides).

TABLE 12

|  | Fe | Nd | Pr | Dy | Al | Si | Co |
|---|---|---|---|---|---|---|---|
| Heat Treatment Product | 59.8 | 18.9 | 5.2 | 4.1 | 0.1 | — | 0.9 |
| (a) Powder Floating in Water | 12.3 | 47.5 | 12.8 | 10.6 | 1.3 | — | 0.7 |
| (b) Powder Settled in Water | 59.4 | 20.7 | 6.4 | 5.7 | 1.1 | — | 2.5 |

(Unit: mass %, —: below detection limit)

Example 7

5 g of a used $DyFe_2$ alloy piece, which had been used as a diffusion source for diffusing Dy into an R—Fe—B based permanent magnet (containing magnet-derived light rare earth elements, boron, etc., and having a particle size of about 400 μm to 700 μm) was fired in air at 900° C. for 10 hours to perform an oxidation treatment. The molar concentration of oxygen contained in the used $DyFe_2$ alloy piece thus oxidation-treated was 4.4 times the molar concentration of rare earth elements, and the molar concentration of boron was 0.14 times the molar concentration of rare earth elements (0.50 mass %). The same experiment as in Example 6 was performed, except that this oxidation-treated used $DyFe_2$ alloy piece was used as the object to be heat-treated, and that the heat treatment time was changed to 2 hours. As a result, it was possible to obtain a powder containing oxides of rare earth elements as main components from the used $DyFe_2$ alloy piece.

INDUSTRIAL APPLICABILITY

The present invention makes it possible to provide a method for recovering a rare earth element, including subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, according to which an oxide of a rare earth element can be efficiently separated from an iron group element at low treatment cost, and also wear and damage to the treatment container can be suppressed to allow the container to be used repeatedly for a long period of time. In this respect, the present invention is industrially applicable.

The invention claimed is:

1. A method for recovering a rare earth element, comprising subjecting a workpiece containing at least a rare earth element and an iron group element to an oxidation treatment, then turning the treatment environment into an environment where carbon is present, and subjecting an oxidation-treated workpiece to a heat treatment, thereby separating a rare earth element in the form of an oxide from an iron group element, the method being characterized in that the oxidation-treated workpiece is mixed with petroleum coke as a carbon supply source, placed in a treatment container, and then subjected to the heat treatment in an inert gas atmosphere or in vacuum at a temperature of between at least 950° C. and at most 1100° C.

2. The method according to claim 1, characterized in that the petroleum coke is in granular or powder form having a particle size of 125 μm or less.

3. The method according to claim 1, characterized in that at least part of the workpiece is in granular or powder form having a particle size of 500 μm or less.

4. The method according to claim 1, characterized in that the workpiece has an iron group element content of 30 mass % or more.

5. The method according to claim 1, characterized in that the workpiece is an R—Fe—B based permanent magnet.

6. The method according to claim 1, characterized in that a mass obtained as a heat treatment product is ground, and then a powder containing an oxide of a rare earth element as a main component is separated from an alloy of an iron group element and carbon by a magnetic method and recovered.

* * * * *